(No Model.)
D. E. WALKER.
VALVE FOR PNEUMATIC TIRES.
No. 577,698.　　　　　　　　　Patented Feb. 23, 1897.
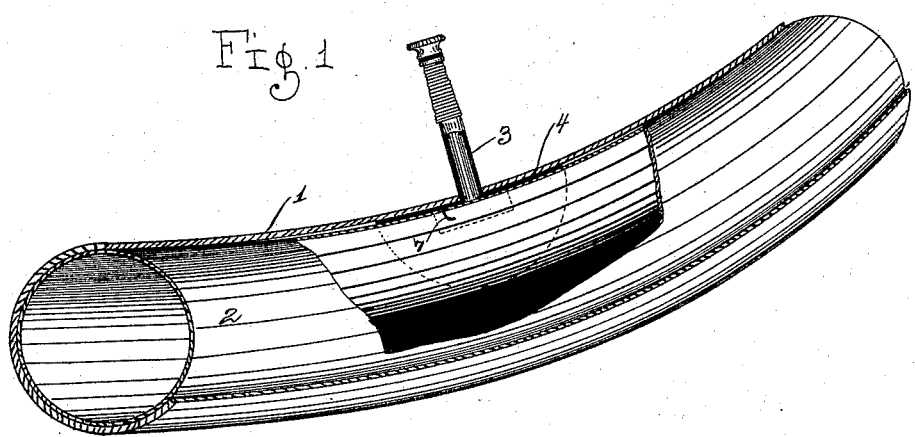
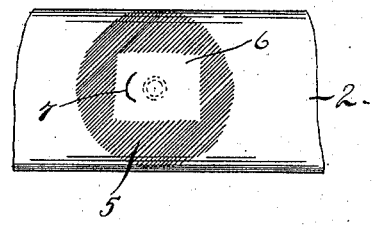
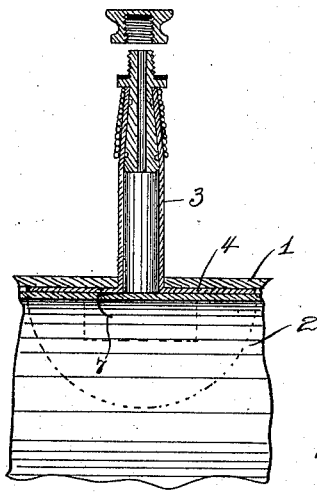
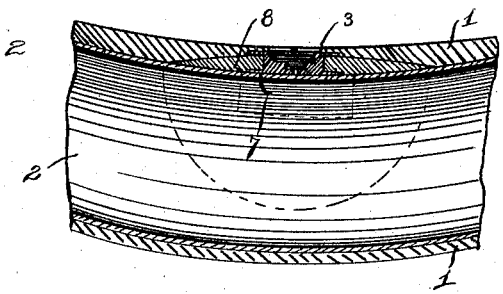
Witnesses
A. S. Courtright
Vienna Purdy
Inventor
Dallas E. Walker
By Attorney
V. H. Lockwood

UNITED STATES PATENT OFFICE.

DALLAS E. WALKER, OF INDIANAPOLIS, INDIANA.

VALVE FOR PNEUMATIC TIRES.

SPECIFICATION forming part of Letters Patent No. 577,698, dated February 23, 1897.

Application filed May 20, 1895. Serial No. 550,022. (No model.)

*To all whom it may concern:*

Be it known that I, DALLAS E. WALKER, of Indianapolis, county of Marion, and State of Indiana, have invented a certain new and useful Valve for Pneumatic Tires; and I do hereby declare that the following is a full, clear, and exact description thereof, reference being had to the accompanying drawings, in which like figures refer to like parts.

My invention relates to a valve for pneumatic tires, and has for its object simplicity, cheapness, and great efficiency. Its full nature will be understood from the following description and accompanying drawings.

Figure 1 is a perspective of a portion of a pneumatic tire, the outer and inner tubes being partly in section. Fig. 2 is a plan view of the portion of the inner tube where the valve-stem is attached. Fig. 3 is an enlarged view of the valve and a portion of the tire in longitudinal section. Fig. 4 shows a modified form.

In the drawings, 1 represents the outer covering, and 2 the inner tube, of a pneumatic tire.

3 is a valve-stem which may be made in any well-known way, and it extends through the outer covering and is secured to the inner tube by cementing or otherwise securing the stem-base 4 thereto. Only the outer portion of the stem-base is secured, as is shown by the cement 5 in Fig. 2, leaving a portion of the stem-base about the stem, say the size of the blank space 6 in Fig. 2, free from any connection with the inner tube. In this free portion of the inner tube I make a slit 7 or other opening beside the opening in the stem. There may be one or more of these slits, but one suffices. The form of the slits may be such as desired.

The operation of this valve is apparent from the description. When air is being forced into the tire, the portion of the inner tube immediately about the stem is depressed, causing the slit to open and admit air. When the tube is filled, the pressure of the air inside will keep the free portion of the inner tube that is beneath the stem-base up tight against such base, whereby the air cannot escape.

The tire can be readily deflated by pressing its sides together at the valve. This makes a wrinkle in the free or uncemented portion of the inner tube beneath the stem-base and permits the air to escape.

A modified form is shown in Fig. 4. The stem there is cut off flush with the outer covering and a thick web 8 is used as a substitute for the stem-base in the other form. The advantage of this arrangement is that the stem does not interfere with the wood or metal rim of the bicycle, and such rim cannot destroy the valve mechanism when the tire slips on the rim by reason of the stem being pulled out of the tire or torn off; but one advantage of the form shown in Fig. 1 over valves heretofore used is that when the tire slips in the rim and should cut off the valve-stem it will not affect the valve any, as the tire will remain inflated.

What I claim as my invention, and desire to secure by Letters Patent, is—

A valve for a pneumatic tire comprising the combination with the air-containing tube of a tire having an aperture in it, of an air-inlet tube with a base whose outer edge is secured to the air-containing tube so as to surround the aperture in the latter but prevent the aperture from registering with the opening in the air-inlet tube.

In witness whereof I have hereunto set my hand this 16th day of May, 1895.

DALLAS E. WALKER.

Witnesses:
V. H. LOCKWOOD,
ALBERT S. COURTRIGHT.